United States Patent [19]
De Jaeger et al.

[11] 4,377,558
[45] Mar. 22, 1983

[54] NOVEL POLYCHLOROPHOSPHAZENES AND PROCESS FOR THEIR PREPARATION

[75] Inventors: Roger De Jaeger, Chereng; Moncef Helioui, Villeneuve d'Ascq; Emile Puskaric, Pont a Marcq, all of France

[73] Assignee: Institut Mondial du Phosphate, Casablanca, Morocco

[21] Appl. No.: 187,184

[22] Filed: Sep. 15, 1980

[30] Foreign Application Priority Data

Sep. 27, 1979 [FR] France ................... 79 24037

[51] Int. Cl.³ .................................. C01B 25/10
[52] U.S. Cl. ........................... 423/300; 260/926; 260/927 N; 564/13; 564/14
[58] Field of Search ........................... 423/300

[56] References Cited

U.S. PATENT DOCUMENTS 2,925,320  2/1960  Kahler ................. 423/300
2,980,506  4/1961  Habernickel et al. ........ 423/300

FOREIGN PATENT DOCUMENTS 572951   3/1959  Canada ................... 423/300
1321102  6/1973  United Kingdom ........ 423/300
176416   3/1965  U.S.S.R.

OTHER PUBLICATIONS

Lund, L. G. et al., Phosphonitrilic Derivatives, Part I, The Preparation of Cyclic and Linear Phosphonitrilic Chlorides, *J. Chem. Soc. London*, p. 2542 (1960).
Allock, H. R. et al., Phosphonitrilic Compounds, VI, High Molecular Weight Poly(alkoxy- and aryloxyphosphazenes), *Inorg. Chem.*, 1966, 5, p. 1709.
Becke-Goehring, M. et al., Die Verbindungen mit der Zusammensetzung P₂NCl₇, *Z. Anorg. all. Chem.*, 1963, 325, p. 287.
Volodin, A. A. et al., Synthesis and Investigation of "Alkoxytriphosphazophosphinyls", *Z. Obshchei Khimii*, 42, p. 510 (1972).
Riesel, L. et al., "Synthese und Eigenschaften Linearer Phosphorylchlorphosphazene", *Z. anorg. allg. Chem.*, 411, pp. 148–152 (1975).
Manley, T. R. et al., The Infra-red Spectrum and Vibrational Assignments of Poly(phosphonitrilic chloride), *Polymer*, 1969, 10, p. 307.
Novobilsky, V. et al., "Zur Trennung der Oligomeren Chloro-Cyclophosphazene" [NPCl₂]ₙ (n=3–7), *Z. anorg. allg. Chem.* 416, p. 187.
Novobilsky, V. et al., "Zur Trennung der Chloro-Cyclophosphazene" [NPCl₂]ₙ (n=3–15), *Z. anorg. allg. Chem.*, 423, p. 273, (1976).
Emsley, Jr. et al., "A New and Simple Method of Preparing Dichlorophosphinylphosphorimidic Trichloride", *J. Chem. Soc.*, p. 2864 (1971).
Yakubovich, A. Ya., et al., "A New Method for Preparing Polyphosphazenes", *Russian Journal of Inorganic Chemistry*, vol. 8, No. 8, pp. 953–957 (1963).
Yakubovich, A. Ya., et al., "A New Synthesis of Polyphosphonitriles", *Zh. Neorgan. Khim.* No. 8, 534 (1963).
Yakubovich, A. Ya., et al., "Synthesis of Alkyl- and Aryl-substituted Phosphazenephosphoxides and some of their Transformations", *Zh. Neorgan. Khim.* 11 (4), 810–816 (1966).

*Primary Examiner*—O. R. Vertiz
*Assistant Examiner*—Wayne A. Langel
*Attorney, Agent, or Firm*—Browdy & Neimark

[57] ABSTRACT

The present invention relates to novel polychlorophosphazenes and to the process for their preparation.

These polychlorophosphazenes of the general formula:

$$Cl_2(O)\,P\,[NPCl_2]_n Cl$$

are prepared by the polycondensation of P trichloro-N dichlorophosphoryl-monophosphazene with the controlled release of $POCl_3$ according to the equation:

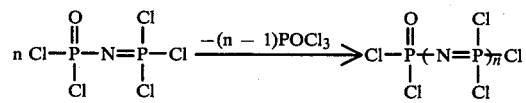

The novel polychlorophosphazenes so obtained are useful as antiflame materials, as coatings, as fertilizers, etc. . . .

22 Claims, 6 Drawing Figures

Fig. 5
Fig. 6
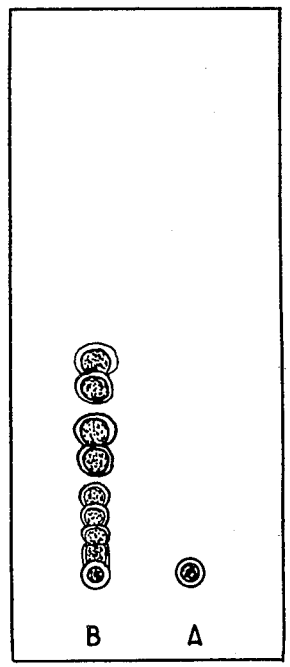
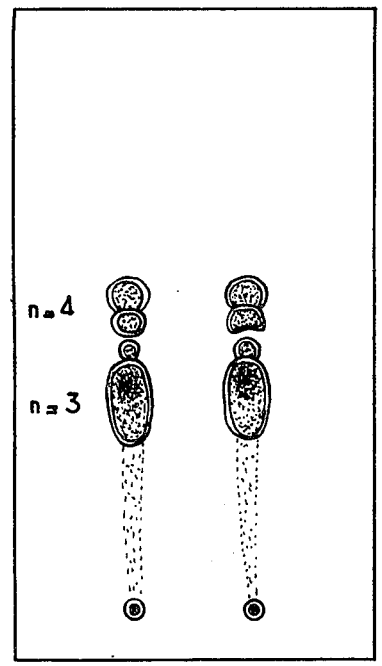

NOVEL POLYCHLOROPHOSPHAZENES AND PROCESS FOR THEIR PREPARATION

BACKGROUND OF THE INVENTION

1. Field of the Invention

The present invention relates to novel linear polychlorophosphazenes and to the process for their preparation.

2. Description of the Prior Art

Numerous publications describe the preparation of cyclic polychlorophosphazenes. Such preparation is relatively easy to accomplish in view of the tendency of the lower compounds of the series of the chlorophosphazenes to ring formation. It is noted, however, that linear polychlorophosphazenes have a considerably greater economic interest than cyclic polychlorophosphazenes, on account of the range of their potential uses as materials having very extensive and very diverse applications like those of silicones, plastics materials and natural or synthetic elastomers, as antiflame and anticombustion materials or additives conferring antiflame and anticombustion properties on the materials and substances to which they are added, as coatings, in particular sealing coatings, in the biomedical field, as fertilizers, or as lubricants, in particular. Moreover, certain elastomers obtained by various substitutions on linear polychlorophosphazenes are found to have excellent behavior at low temperatures, as well as with respect to corrosive reactants. The major application of polychlorophosphazenes is represented by the fact that the latter constitute the optimum starting point for the production of polyorganophosphazenes, which are polymers having remarkable properties.

Some processes for the preparation of linear polychlorophosphazenes have been proposed in accordance with the prior art. Thus L. G. LUND, N. L. PADDOCK, F. E. PROCTOR and H. T. SEARLE, J. Chem. Soc. London, p. 2542, 1960, have described the production of polychlorophosphazenes according to the following reaction diagram:

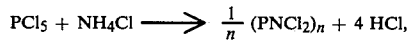

in symmetrical tetrachloroethane as solvent. However this route involves a large number of reaction steps and constitutes a long and laborious process, since the crude product to which it gives rise is a mixture of cyclic compounds, present in the proportion of 90% and linear compounds of the $PCl_5 (PNCl_2)_n$ type where n does not exceed 20, in a proportion of 10%.

To obtain longer linear polymers, the cyclic compounds are then treated with solvents to separate the trimer and tetramer from which there is extracted, by means of suitable solvents, the pure $(NPCl_2)_3$ which is subjected to heat polymerization under reduced pressure at a temperature of 250° C. for two days, to give a linear $(PNCl_2)_n$ polymer with an optimum conversion ratio of 70% ((H. R. ALLCOCK, R. L. KUGEL, K. J. VALAN - Inorg. Chem. 1966, 5, 1709).

On the other hand, BECKE-GOEHRING and LEHR Z. Anorg. all. Chem. 1963, 325, p. 287, have prepared dichlorophosphorylpentachlorodiphosphazene $Cl_2(O)P-N=PCl_2-_2Cl$ by the reaction of $SO_2$ on the ionic compound $(Cl_3P=N-PCl_2=N-PCl_3)PCl_6$ obtained by the reaction of phosphorus pentachloride with ammonium chloride in a solvent with a low dielectric constant: it was not however possible for these authors to obtain higher homologs in which n>2, by reason of the formation of cyclic polychlorophosphazenes consequent upon the reaction of the ionic compound with the ammonium chloride. KIREJEW and Coll., Z. obsc. Chim. URSS, 42 (104), 510, (1972) have, besides, described the preparation of dichlorophosphorylheptachlorotriphosphazene $Cl_2(O)P-(-N=PCl_2-)_3Cl$ by cleavage of the ring of the hexachlorocyclotriphosphazene by means of $PCl_5$ and reaction of the scission product with $SO_2$. On the other hand, RIESEL and SOMIESKI, Z. anorg. allg. Chem. 411, p. 148-152, (1975) proposed the synthesis of the first members of the series of the linear phosphorylchlorophosphazenes by step by step lengthening of the P—N—P chain by successively reacting $POCl_3$ or short chain phosphorylchlorophosphazenes, with hexamethyldisilazane and phosphorus pentachloride. However, they did not succeed in going beyond the triphosphazene of the formula $Cl_2(O)P-(-N=PCl_2-)-_3Cl$ which, all the same, is an unstable compound which is decomposed by heating above 100° C., with the liberation of $POCl_3$ and the formation of $PNCl_2$ $_n$ high polymers and of about 20% of hexachlorocyclotriphosphazene, the diphosphazene having besides also a tendency, if it is overheated, to become condensed with the liberation of $POCl_3$ and formation of $PNCl_2$ $_n$ high polymers.

It is also known from the USSR Pat. No. 176 416 in the names of V. S. Yakubovich, I. V. Lebedova, A. Ya. Yakubovich and N. I. Shvetsov, Karpov Scientific Research Physical-Chemical Institute, filed 25 March 1963 and granted 22 November 1965, that polychlorophosphazenes of the formula $Cl_2(O)P\text{-}(NPCl_2)_{\overline{n}}Cl$ can be prepared from the following polymers: $Cl(PNCl_2)_{10}PCl_4$ and $PCl_5(NPCl_2)_4$, by reaction with $SO_2$, which signifies that the starting product is always a low polymer, and in no case the monomer. It is impossible to obtain the monomer by the process of this USSR Pat., as this process teaches that the starting product is obtained from a mixture of cyclic and linear compounds which are the reaction product of $PCl_5$ and $NH_4Cl$.

It emerges from the Prior Art mentioned in the foregoing, that the various direct routes proposed do not enable the production of linear polychlorophosphazenes, and only permit, at the best, the obtaining of linear dimers or trimers whose potential industrial applications are very limited. The sole route at present adopted for the production of long chain linear polychlorophosphazenes, is the indirect route, described first above, of the treatment of cyclic compounds. However, the large number of operations that it requires, of which the yield is rarely quantitative, and the utilization of large amounts of expensive solvents, make its cost price prohibitive and weighs heavily on the cost of the polychlorophosphazenes obtained. In addition, this method only permits the obtaining of very long chain polychlorophosphazenes, of the order of approximately 15,000 $NPCl_2$ units, and it cannot be controlled to permit the production of polychlorophosphazenes whose chain length can be determined at will and notably of short or medium chain length linear polychlorophosphazenes, that is to say, including from 4 to 1,000 units or more, for example.

Consequently, it is an object of the present invention to provide a novel process for the preparation of polychlorophosphazenes which responds better to the requirements of practice than the processes proposed by the Prior Art, notably in that it constitutes a simple, rapid and quantitative synthetic process which enables the cost price of the products obtained to be considerably lowered. It is another object of the invention to enable the production of polychlorophosphazenes by a direct route, that is to say without resorting to transformation of cyclic polychlorophosphazenes. It is a further object of the invention to enable the production of polymers in which it is possible to control at will the degree of polymerization according to the applications envisaged.

GENERAL DESCRIPTION OF THE INVENTION

According to the present invention, there are provided novel linear polychlorophosphazenes, characterized in that they correspond to the formula I below:

$$Cl_2(O)P \ NPCl_2 \ _nCl \qquad (I)$$

in which n is equal to or greater than 4, the value of n being controllable as desired to enable the production of chains of any desired average length, and in which n can be equal to or greater than 1,000.

The production of such polymers is surprising and unexpected, considering that the Prior Art only enabled the the preparation of polymers of formula I in which n=2 or 3 and, besides, of polymers not including a terminal oxygen, in which n is of the order of 15,000, without being able to obtain intermediate polymers.

The advantage obtained by the possibility of controlling at will the value of n is represented by the fact that it is possible to confer certain desired physical properties on the polymers finally obtained, and to vary these properties over an extensive range.

According to another aspect of the present invention, there is provided a process for the preparation of novel long chain linear polychlorophosphazenes of the above formula I, which process is characterized in that the polycondensation by heating P trichloro-N dichlorophosphoryl-monophosphazene of formula II below:

is carried out in accordance with the equation III below:

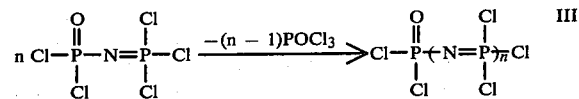

with controlled release of POCl₃, to obtain quantitatively a practically pure polychlorophosphazene of formula I, of controlled degree of condensation.

According to an advantageous embodiment of the process according to the present invention, the polycondensation of the P trichloro-N dichlorophosphoryl-monophosphazene is carried out at least in part, at a temperature equal to or higher than 240° C.

According to another advantageous embodiment of the process according to the present invention, the controlled polycondensation of the P trichloro-N dichlorophosphoryl-monophosphazene is carried out at least in part at atmopheric pressure.

According to yet another advantageous embodiment of the process according to the present invention, the controlled polycondensation reaction is continued until the practically complete removal of the theoretical POCl₃ without branching reactions occurring.

According to another advantageous embodiment of the process according to the present invention, the controlled polycondensation reaction is carried out by heating at a temperature equal to or higher than 240° C., for a relatively short time, generally less than 8 hours.

Using an advantageous feature of the process according to the present invention, the controlled polycondensation of the P trichloro-N dichlorophosphoryl-monophosphazene is carried out at a pressure higher than atmospheric pressure, preferably of the order of 10 bars to several Kbars.

By another advantageous feature of the process according to the present invention, the pressure in the course of the polycondensation reaction is varied, which pressure starts at atmospheric pressure and is terminated at reduced pressure, preferably at the order of 10 to 0.1 mm Hg.

By yet another advantageous feature of the process according to the invention, the controlled polycondensation reaction starts at a pressure higher than atmospheric pressure, of the order of 10 bars to several Kbars preferably, is continued at atmospheric pressure and is terminated at reduced pressure, of the order of 10 to 0.1 mm Hg, preferably, the period during which the pressure above atmospheric pressure is applied representing about 10 to 15% of the total duration of the reaction, the time during which the polycondensation reaction proceeds at atmospheric pressure representing about 70 to 80% of the total duration of the reaction and the time for which the reduced pressure is applied representing about 10 to 15% of the total duration of the reaction.

Also according to the invention, the controlled polycondensation reaction starts by heating at a temperature preferably comprised between 280° and 350° C., for a suitable period, of the order of 10 to 25% of the total duration of the reaction, then the heating temperature is gradually lowered to 240° C., at which temperature it is continued until the end of the reaction.

According to an advantageous feature of the process according to the present invention, the controlled polycondensation reaction is carried out with stirring.

According to another advantageous feature of the method according to the invention, the controlled polymerization reaction is carried out, at least partly, in an atmosphere of inert gas such as anhydrous nitrogen in particular, which facilitates the evolution of the POCl₃ and reduces, through this fact, the duration of the reaction.

The degree of condensation obtained is a function of various parameters, and notably of the temperatures applied, of the duration of heating, of the volume treated, of the pressures utilized, of the reaction conditions, such as stirring, the atmosphere in which the reaction takes place, etc..., which parameters can be programmed for the obtaining of the optimum desired result.

According to another advantageous variation in the process according to the invention, the product of the polycondensation reaction is purified by treating it with a solvent for cyclic phosphazenes, at the same time a solvent for short chain linear polychlorophosphazenes (where n is less than 4 or 5), such as petroleum ether, for example.

The process according to the invention enables the obtaining of linear polychlorophosphazenes of formula I, having a very low percentage of impurities, always less than 5%, which are removed by the above purification treatment. These impurities are constituted by cyclic polychlorophosphazenes and short chain linear polyphosphazenes; the 95% of products which precipitate in the course of this purification treatment have been identified as being high polymers of chlorophosphazene, of formula I, by the following methods:

The IR spectrum of the polychlorophosphazenes obtained according to the invention, and which is represented in FIG. 1, shows:

an intense and wide absorption band in the 1300 $cm^{-1}$ region characteristic of the elongation of the P=N bound, (resolved in the case of thin films into two components at 1310 and 1240 $cm^{-1}$)

two absorptions of average intensity at 755 and 470 $cm^{-1}$ characteristic respectively of the deformation of the N—P—N and P—N—P bridges;

two absorptions of strong intensity at 585 $cm^{-1}$ and average intensity at 535 $cm^{-1}$ relating to the elongations of the P-Cl bond.

(These observations were made by comparison with the studies of MANLEY and WILLIAMS (Polymer, 1969, 10,307), relating to the high polymer $(NPCl_2)_n$);

a narrow band at about 680 $cm^{-1}$ corresponding to residual benzene (the benzene being the solvent for the linear polychlorophophazenes).

The NMR spectrum of Phosphorous 31 in the accompanying FIG. 2, exhibits a peak at $+18.8$ ppm/$H_3PO_4$ 85% in accordance with the results of ALLCOCK and Coll. (Inorg. Chem. 1966, 5, 1709)

The UV spectrum confirms by its absorption in the 370 nm region, the formation of linear phosphazenes.

Thin layer chromatography of the crude reaction product, done according to the indications of NOVOBILSKY and Coll., Z. Anorg. Allg, Chem. 1975, 416, 187 and 1976, 423, 273 establishes the almost nonexistence of cyclic phosphazenes.

Measurements of the glass transition temperature, carried out by differential enthalpic analysis on polymers of different lengths are always located in the vicinity of $-60$ C., the number of elementary units seeming only to have a very slight influence on the latter.

Apart from the foregoing features, the invention comprises yet other features which will emerge from the description which follows.

The invention relates more particularly to the linear polychlorophosphazenes according to the invention, the processes of preparation of these polymers according to the foregoing features, as well as to the means applied for the preparation of these linear polymers, the overall processes in which said processes are included and the products produced by means of the long chain linear polychlorophosphazenes according to the invention.

DESCRIPTION OF PREFERRED EMBODIMENTS

The invention will be better understood by means of the additional description which follows, with reference to the examples of carrying-out of the process according to the invention.

It must however be understood, of course, that these examples of the application of the invention are given purely by way of illustration and are not to be considered as constituting a limitation of the scope of the invention in any way.

EXAMPLE I

1. Preparation of P trichloro-N dichlorophosphoryl-monophosphazene.

The P trichloro-N dichlorophophoryl-monophosphazene of formula II above is easily obtained by applying the method developed by EMSLEY and UDY J. Chem. Soc. (A) 1971, 2863 who react $PCl_5$ with $(NH_4)_2SO_4$ in symmetrical tetrachlorethane or chlorobenzene at their boiling point, by the following procedure:

A. - $P_2NOCl_5$ is prepared in symmetrical tetrachlorethane, from 25.43 g of $PCl_5$ and 3.59 g of $(NH_4)_2SO_4$, in 55 ml of sym. $C_2H_2Cl_4$. The reaction lasts an hour at 146° C. and permits the production of 14.55 g of $P_2NOCl_5$.

B. - As an alternative, the $P_2NOCl_5$ is prepared in chlorobenzene at 132° C. from 28.82 g of $PCl_5$ and 4.07 g of $(NH_4)_2SO_4$, in 62 ml of $C_6H_5Cl$. The reaction lasts 2 hours at the end of which 14.55 g of pure crystalline $P_2NOCl_5$ is collected.

2. Preparation of a $Cl_2(O)P$ $NPCl_2$ $_nCl$ polymer 14.55 g of $P_2NOCl_5$ obtained and described at 1. above, were heated at 240° C. for 8 hours, at atmospheric pressure. In this way a polymer $Cl_2(O)P(NPCl_2)_nCl$ of average molecular weight equal to 3500 (determined by vapor pressure osmometry) was obtained, which corresponds to $n \simeq 29$.

There was a release of $POCl_3$ in the course of the reaction and if the loss of $POCl_3$ corresponding to a polymer of molecular weight 3500 is calculated, 8.0 g is found.

Figure 1:
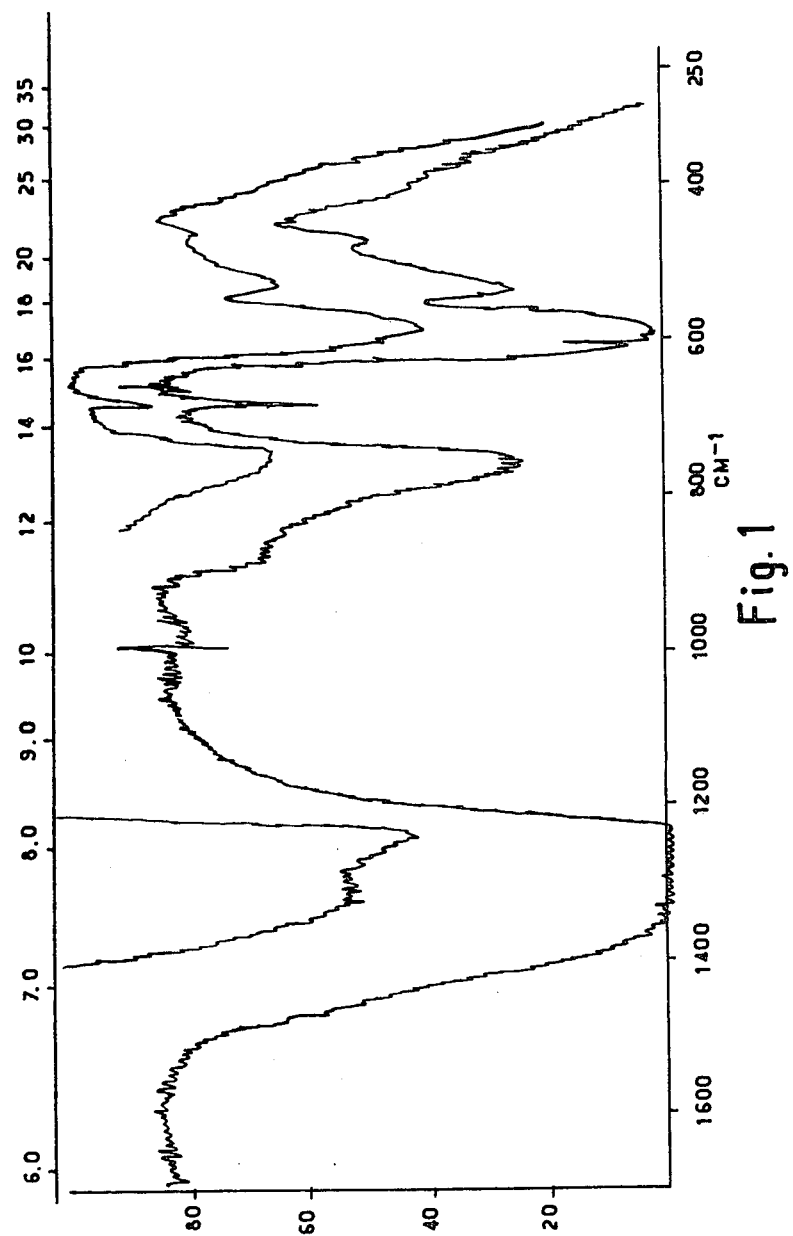
Figure 2:
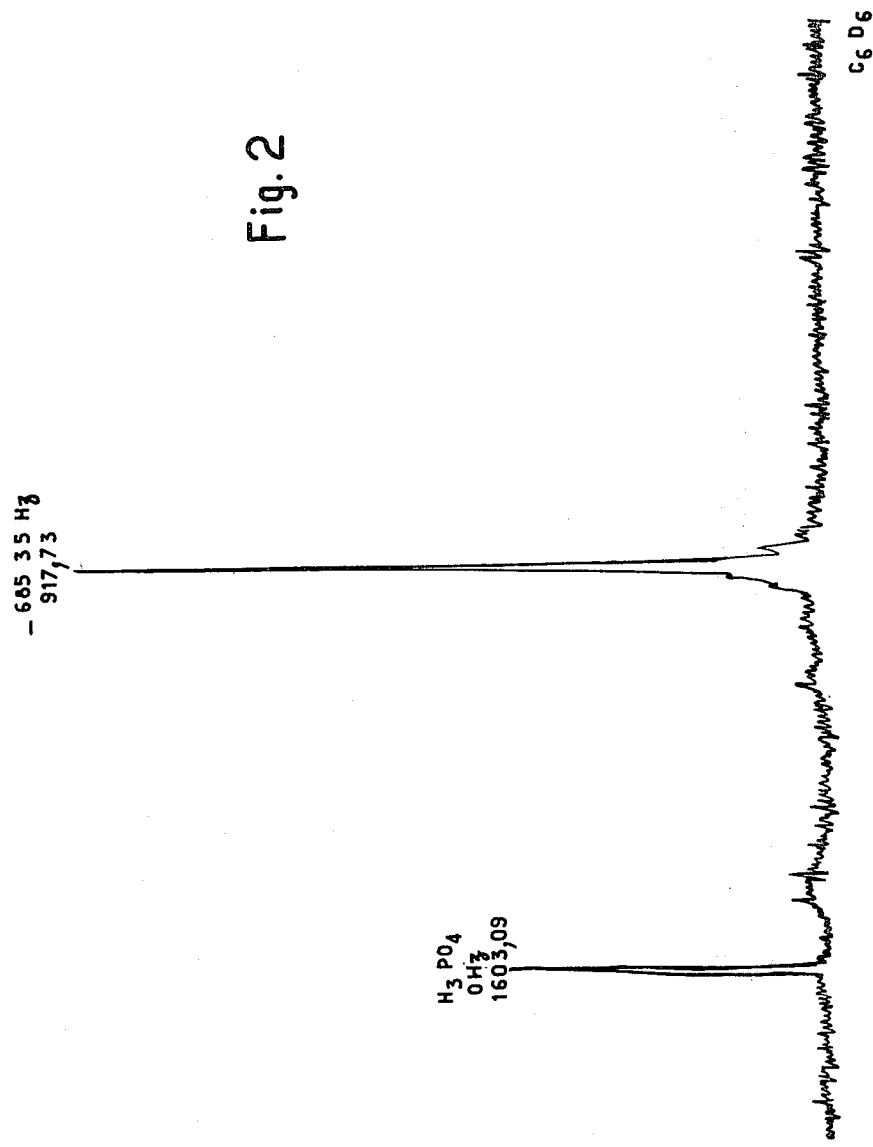
Figure 3:
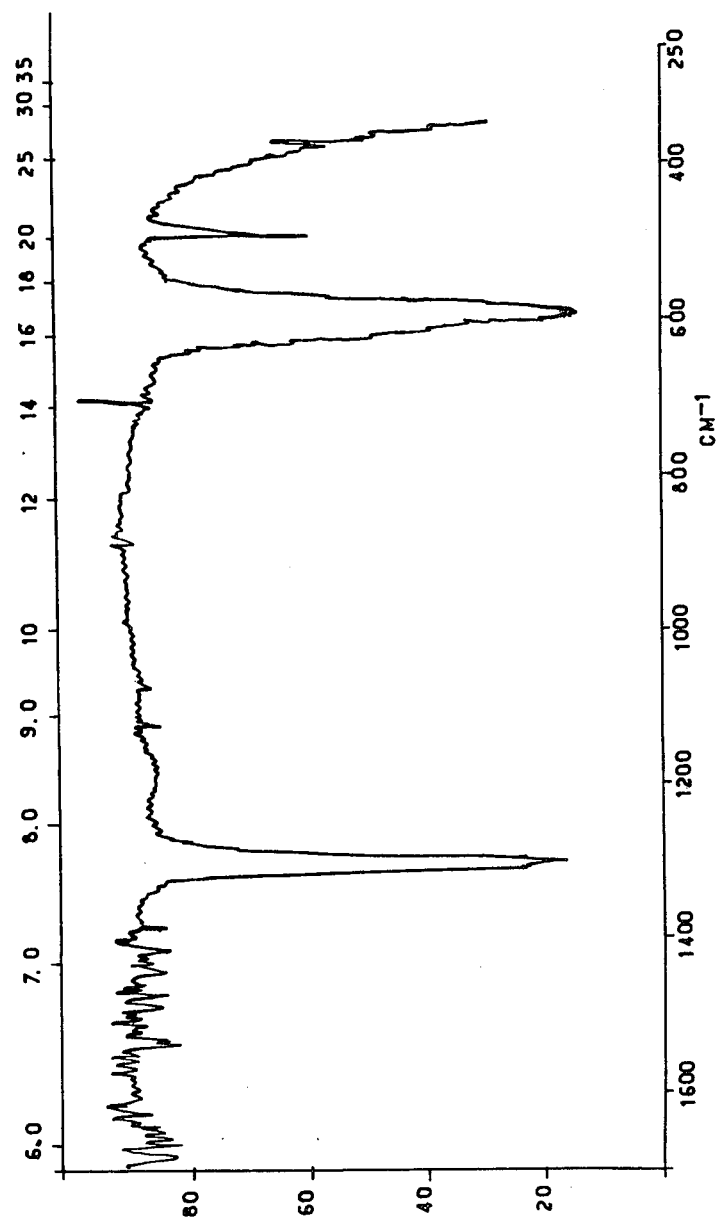

It should be noted that the process according to the invention enables the quantitative recovery of the phosphorus of the $P_2NOCl_5$ partly in polymer form, and partly in the form of spectroscopically pure $POCl_3$ (as emerges from accompanying FIG. 3).

EXAMPLE II 20.82 g of $P_2NOCl_5$ (obtained as described in Example I 1. above) was heated for 8 h 30, at a temperature of 280° C., maintaining moderate stirring throughout the duration of heating.

Figure 4:
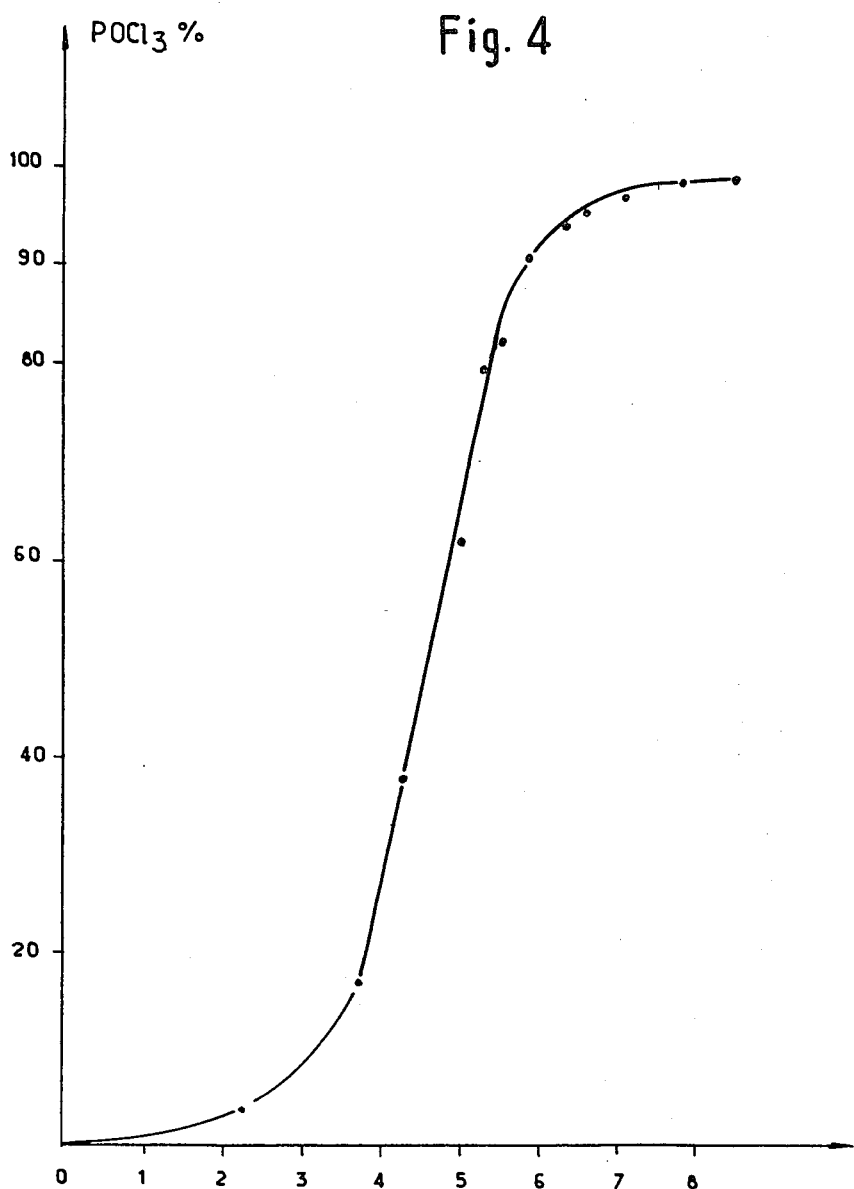

The volume percent graph of $POCl_3$ collected as a function of time (100% corresponding to complete removal) was established: cf. FIG. 4).

The total weight of $POCl_3$ collected was 160 g reduced to 1 mole of starting $P_2NOCl_5$. The deviation with respect to 153.5 g (weight of 1 mole of $POCl_3$ corresponding to the production of $(NPCl_2)_n$) is due to the distillation of some $P_2NOCl_5$. This proves that when the experiment is pursued to its limit, the measurement of the volume of $POCl_3$ does not suffice to determine the number of units. The crude product obtained, quite colorless, was completely soluble in benzene, which proves the absence of branched polychlorophosphazenes.

The results of analysis of the product are as follows: theoretical for $(NPCl_2)_n$ Cl, 61.21%; N, 12.07%; P, 26.72% found Cl, 61.52%; N, 11.90%; P, 26.81%

This product was treated with petroleum ether at 40-60 C. which is a precipitating agent for the $(NPCl_2)_n$ high polymers and a solvent for cyclic phosphazenes as well as phosphazenes of the type $Cl_2(O)$-

P—NPCl$_2$—$_n$Cl where n is small. In this way a fraction representing 5% by weight of the treated product was solubilized.

A chromatographic check (thin layer chromatography on a silica plate-Eluent: hexane) of the insoluble fraction proves the absence of residual P$_2$NOCl$_5$, as well as of cyclic phosphazenes (cf. chromatographic plate in FIG. 5-spot A-which is to be compared with the chromatographic plate shown in FIG. 6 which shows the spots representing cyclic polychlorophosphazenes). Determination of the average molecular weight carried out by means of a Knauer vapor pressure osmometer, shows that the latter is higher than 20,000.

As regards the soluble phase, a chromatographic check (see the plate shown in FIG. 5-spot B) shows the existence of a series of compounds of very close Rf: these can only be cyclic or linear phophazenes of the type Cl$_2$(O)P—NPCl$_2$ $_n$Cl.

The I.R. spectrum of this phase, as well as the NMR P$^{31}$ spectrum of the crude product (which permits the conclusion of the absence of (NPCl$_2$)$_3$ and (NPCl$_2$)$_4$) favor the second hypothesis.

The NMR P$^{31}$ spectrum of this soluble phase permits affirmation that the amount of cyclic phosphazenes (NPCl$_2$)$_n$ with $3 \geq n \geq 6$ in the crude product is practically negligable. It has been verified that the average molecular weight of the polymer obtained is of the order of 28 000 to 29 000, the average n being of the order of 240 to 245.

It results from the foregoing description that there are obtained, according to the present invention, long chain linear polychlorophosphazenes which show numerous possibilities of industrial application both in themselves, as indicated above, and as starting materials for the preparation of polyorganophosphazenes by means of substitution reactions of the following types:

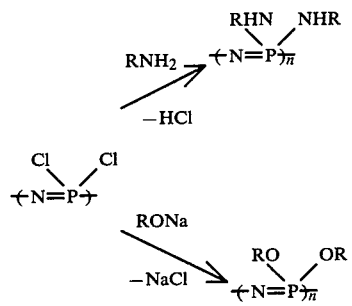

which have permitted the production of the following polymers: [NP (OMe)$_2$] $_n$; [NP(OCH$_2$CF$_3$)$_2$] $_n$; [NP (OCH$_2$C$_3$F$_7$)$_2$] $_n$; [NP (OCH$_2$CF$_3$) (OCH$_2$C$_3$F$_7$)] $_n$; [NP (OCH$_2$C$_3$F$_7$)$_2$] $_n$ etc. . . . , whose properties are remarkable, particularly for [NP (OCH$_2$CF$_3$) (OCH$_2$C$_3$F$_7$)] $_n$ which is an amorphous elastomer resistant to hydrolysis, to heat, as well as to the majority of solvents and chemical products, and which are useful in industry as elastomers, thermoplastic materials, possibly flexible, adapted to provide films and as glass substitutes. The invention procures, in addition, the advantage of providing a process for the production of long chain linear polychlorophosphazenes, relatively inexpensively since its cost price is ten times less that that of the process used at present on the industrial scale of treating cyclic chlorophosphazenes, the process according to the invention having, in addition, the advantage of constituting a simple, rapid and quantitative method of polymerization.

As emerges from the foregoing, the invention is in no way limited to those of its types of application, embodiments and uses which have just been more explicitly described; it encompasses, on the contrary, all modifications which may occur to the spirit of the technician skilled in the art, without departing from the framework nor the scope, of the present invention.

We claim:

1. Linear polychlorophosphazenes, corresponding to the following formula I:

$$Cl_2(O)P \, (NPCl_2)_n Cl \qquad \text{I}$$

in which n is greater than 4, the value of n being controllable as desired to enable the production of chains of any desired medium length, said polychlorophosphazenes being substantially free of cyclic analogs and other impurities.

2. Process for the preparation of linear polychlorophosphazenes of the formula Cl$_2$(O)P(NPCl$_2$)$_n$Cl, said process comprising polycondensation by heating of P trichloro-N dichlorophosphorylmonophosphazene of the following formula II:

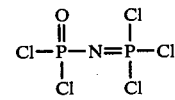

in accordance with the following equation III:

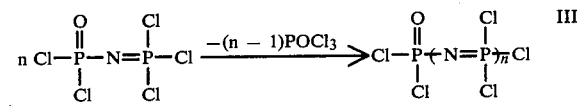

with controlled release of POCl$_3$, to obtain quantitatively a practically pure polychlorophosphazene, of controlled degree of condensation, wherein n$\geq$4.

3. Process according to claim 2, wherein the controlled polycondensation of the P trichloro-N dichlorophosphoryl-monophosphazene is carried out at a temperature equal to or higher than 240° C.

4. Process according to claim 3, wherein the controlled polycondensation of the P trichloro-N dichlorophosphoryl-monophophazene is carried out at least in part at atmospheric pressure.

5. Process according to claim 4, wherein the controlled polycondensation reaction is continued until the practically complete elimination of the theoretical POCl$_3$ without branching reactions occurring.

6. Process according to claim 3, wherein the controlled polycondensation reaction is continued until the practically complete elimination of the theoretical POCl$_3$ without branching reactions occurring.

7. Process according to claim 2, wherein the controlled polycondensation of the P trichloro-N dichlorophosphoryl-mono-phosphazene is carried out at least in part at atmospheric pressure.

8. Process according to claim 4, wherein the controlled polycondensation reaction is continued until the practically complete elimination of the theoretical POCl$_3$ without branching reactions occurring.

9. Process according to claim 2, wherein the controlled polycondensation reaction is continued until the practically complete elimination of the theoretical POCl$_3$ without branching reactions occurring.

10. Process according to claim 9, wherein the controlled polycondensation reaction is carried out at least in part in an inert gas atmosphere.

11. Process according to claim 2, wherein the controlled polycondensation of the P tricholo-N dichlorophosphoryl-monophophaszene is carried out at a pressure higher than atmospheric pressure.

12. Process according to claim 11, wherein said pressure above atmospheric pressure is at least about 10 bars.

13. Process according to claim 2, wherein the pressure in the course of the polycondensation reaction is varied starting at atmospheric pressure and terminating at reduced pressure.

14. Process according to claim 13, wherein said reduced pressure is from about 10 to about 0.1 mm Hg.

15. Process according to claim 2, wherein the controlled polycondensation reaction starts at a pressure above atmospheric pressure, is continued at atmospheric pressure, and is terminated under reduced pressure, the time for which the pressure higher than atmospheric pressure is applied representing about 10 to 15% of the total duration of the reaction, the time for which the polycondensation reaction proceeds at atmospheric pressure representing about 70 to 80% of the total duration of the reaction and the time for which reduced pressure is applied representing about 10 to 15% of the total duration of the reaction.

16. Process according to claim 15 wherein said pressure above atmospheric pressure is at least about 10 bars and said reduced pressure is from about 10 to about 0.1 mm Hg.

17. Process according to claim 2, wherein the controlled polycondensation reaction starts by heating to a temperature between 280° and 350° C., for a suitable duration, of the order of 10 to 25% of the total duration of the reaction, then the heating temperature is gradually lowered to 240° C., the temperature at which it is continued until the end of the reaction.

18. Process according to claim 17, wherein the controlled polycondensation reaction is carried out at least partly in an inert gas atmosphere.

19. Process according to claim 2, wherein the desired degree of condensation is obtained by selectively programming the different parameters, including the temperatures applied, the duration of heating, the volume treated, the pressures applied, the stirring conditions, and the atmosphere in which the polycondensation reaction proceeds.

20. Process according to claim 2, wherein the controlled polycondensation reaction is carried out by heating to a temperature equal to or higher than 240° C., for less than about 8 hours.

21. Process according to claim 2, wherein the controlled polycondensation reaction is carried out under stirring.

22. Process according to claim 2, comprising purifying the product of the polycondensation reaction by treating it with a solvent for cyclic polychlorophosphazenes, which is at the same time a solvent for short chain linear polychlorophosphazenes.

* * * * *